US011567489B2

(12) United States Patent
Baudisch et al.

(10) Patent No.: US 11,567,489 B2
(45) Date of Patent: Jan. 31, 2023

(54) METHOD AND DEVICE FOR EFFICIENT FAULT ANALYSIS THROUGH SIMULATED FAULTS IN A DIGITAL TWIN

(71) Applicant: Siemens Aktiengesellschaft, Munich (DE)

(72) Inventors: Thomas Baudisch, Schondorf am Ammersee (DE); Maximilian Metzner, Bamberg (DE); Francesco Montrone, Riemerling (DE); Jörn Peschke, Nuremberg (DE); Ulrich Rossgoderer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/638,622

(22) PCT Filed: Aug. 4, 2020

(86) PCT No.: PCT/EP2020/071896
§ 371 (c)(1),
(2) Date: Feb. 25, 2022

(87) PCT Pub. No.: WO2021/037498
PCT Pub. Date: Mar. 4, 2021

(65) Prior Publication Data
US 2022/0291674 A1 Sep. 15, 2022

(30) Foreign Application Priority Data
Aug. 28, 2019 (EP) .................................... 19194048

(51) Int. Cl.
*G05B 23/02* (2006.01)
*G05B 19/418* (2006.01)

(52) U.S. Cl.
CPC ..... *G05B 23/0275* (2013.01); *G05B 19/4183* (2013.01); *G05B 19/41885* (2013.01)

(58) Field of Classification Search
None
See application file for complete search history.

(56) References Cited

U.S. PATENT DOCUMENTS

2016/0258845 A1    9/2016   Mankovskii et al.

FOREIGN PATENT DOCUMENTS

| CN | 108919765 | 11/2018 |
| CN | 109779894 | 5/2019 |
| CN | 110083119 | 8/2019 |

OTHER PUBLICATIONS

Sleuthers, Jack et al. "A Digital Twin Method for Automated Behavior Analysis of Large-Scale Distributed IoT Systems", 14th Annual Conference System of Systems Engineering (SOSE), IEEE, pp. 7-12, May 19, 2019.

(Continued)

*Primary Examiner* — Carlos R Ortiz Rodriguez
(74) *Attorney, Agent, or Firm* — Cozen O'Connor

(57) ABSTRACT

A method, device for identifying causes of faults in automated systems and an automated system which forms the device for identifying causes of faults in automated systems, wherein within a digital twin of the automated system, at least one element of the digital twin is assumed to be faulty and then simulated using the digital twin until a fault time, and where at least one faulty element of the automated system is identified as the cause of a fault based on the at least one element assumed to be faulty.

11 Claims, 2 Drawing Sheets

(56) References Cited

OTHER PUBLICATIONS

PCT International Search Report and Written Opinion of International Searching Authority dated Nov. 2, 2020 corresponding to PCT International Application No. PCT/EP2020/071896 filed Aug. 4, 2020.

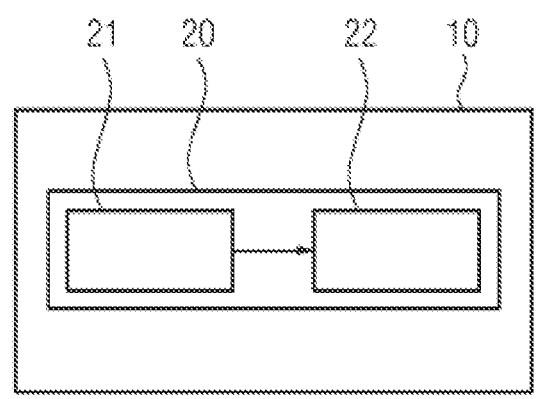

METHOD AND DEVICE FOR EFFICIENT FAULT ANALYSIS THROUGH SIMULATED FAULTS IN A DIGITAL TWIN

CROSS-REFERENCE TO RELATED APPLICATIONS

This is a U.S. national stage of application No. PCT/EP2020/071896 filed 4 Aug. 2020. Priority is claimed on European Application No. 19194048.5 filed 28 Aug. 2019, the content of which is incorporated herein by reference in its entirety.

BACKGROUND OF THE INVENTION

1. Field of the Invention

The present invention relates to a method and an apparatus for identifying causes of faults in automated installations and to an automated installation comprising the apparatus for identifying causes of faults in automated installations.

2. Description of the Related Art

Automation technology relates, in particular, to installation construction in the field of mechanical engineering and electrical engineering. Automation technology is used to automate technical processes in machines, installations or technical systems and therefore to provide automated installations. For this purpose, use is made of different actuators in an automated installation that perform a process (for example, manufacturing process or method). The actuators are controlled by a controller of the automated installation, where the controller receives information relating to the process and/or the installation state via sensors.

The degree of automation of an automated installation is higher, the more independent of human interventions the automated installation is. In addition to relieving humans of dangerous, strenuous or routine activities, automation is used to improve quality and enhances the performance of the automated installation. In addition, personnel costs can be reduced through automation. In this case, human activities are predominantly reduced to the elimination of disturbances, material replenishment, the transportation of finished parts, maintenance and similar work.

The design, implementation of automation functions and the start-up of automated installations are greatly method-oriented. Developed methods and solutions are usually the result of an (abstracting) model consideration of real physical systems (automated installations). In this case, the physical systems are often modeled using a computer-aided virtual representation or model, i.e., a "digital twin". Based on these digital twins, knowledge-based methods can then be developed for the purpose of designing and starting up the various automation functions. Knowledge-based approaches then result, for example, in automated installations containing model-based regulation systems and controllers.

In automated installations, there is the problem of faults that occur and other unforeseen installation states often not being clear and their causes (of faults) not being comprehensible. This may be due to temporal and local fault propagation, for example. This makes it difficult to identify and limit causes of faults because the cause triggering the installation state/fault may be in the temporal past and may no longer be identifiable in the resulting installation state/fault.

Digital twins of automated installations may be expanded such that possible abnormal behavior is modeled and the behavior of the automated installation in the event of a fault, including further effects, is simulated. In this case, there are a multiplicity of possible types and combinations of faults in elements of the automated installation, which are additionally increased by different installation behavior during production (for example, the type and position of workpieces in the system). The resulting combinational explosion generally does not make it possible to simulate and determine every possible installation state and fault in advance.

The solutions provided by established methods such as "Failure Mode and Effect Analysis (FMEA)" (here, in particular, system or process FMEA) or models for "Root Cause Analysis (RCA)" require additional analysis and modeling effort and make it possible to identify faults only within the scope of the modeling and for certain relationships. A comprehensive representation requires an excessive amount of effort and nevertheless does not guarantee that previously unknown installation states or faults can be identified.

SUMMARY OF THE INVENTION

It is an object of the present invention to provide a method for identifying causes of faults in automated installations, an apparatus for identifying the causes of faults in the automated installations, and a corresponding automated installation, each of which solve or at least alleviate the foregoing problems of conventional system.

This and other objects and advantages are achieved in accordance with the invention by a method for identifying causes of faults in automated installations that comprises:
a) continuously capturing a real installation state of an automated installation. Here, the real installation state comprises at least one physical variable of the automated installation;
b) continuously checking whether a fault exists in the captured real installation states and, if a fault exists in the captured real installation states, determining a most recent fault-free installation state in the captured real installation states and determining a fault time;
c) initializing a digital twin of the automated installation with the determined most recent fault-free installation state;
d) simulating the installation state via the initialized digital twin until the determined fault time. In this case, at least one element of the digital twin is assumed faulty;
e) comparing the simulated installation state at the determined fault time with the real installation state at the fault time and
  e1) identifying at least one faulty element of the automated installation as the cause of the fault in the automated installation based on the at least one element of the digital twin assumed faulty if the simulated installation state at the fault time matches the real installation state at the fault time; or
  e2) repeating steps c) to e) if the simulated installation state at the fault time does not match the real installation state at the fault time, where at least one other element of the digital twin is assumed faulty in step d).

It is also an object of the invention to provide an apparatus for identifying causes of faults in automated installations comprises at least one sensor and a controller. The at least one sensor is configured to continuously capture at least one physical variable of the automated installation. The control unit is communicatively connected to the at least one sensor.

The controller is configured to implement the method in accordance with the present invention. For this purpose, the controller unit is configured to continuously capture a real installation state of an automated installation. Here, the real installation state comprises the at least one physical variable captured by the at least one sensor.

The controller is also configured to continuously check whether a fault in the captured real installation states exists and, if a fault exists in the captured real installation states, to determine a most recent fault-free installation state in the captured real installation states and to determine a fault time.

The controller is also configured to initialize a digital twin of the automated installation with the determined most recent fault-free installation state. The controller is also configured to simulate the installation state via the initialized digital twin until the determined fault time. Here, at least one element of the digital twin is assumed to be faulty.

Finally, the controller is configured to compare the simulated installation state at the determined fault time with the real installation state at the fault time and to identify at least one faulty element of the automated installation as the cause of the fault in the automated installation based on the at least one element of the digital twin that is assumed faulty if the simulated installation state at the fault time matches the real installation state at the fault time or to re-initialize the digital twin, simulate the installation state and compare the simulated installation state with the real installation state if the simulated installation state at the fault time does not match the real installation state at the fault time, where at least one other element of the digital twin is assumed to be faulty.

It is also an object of the invention to provide an automated installation that comprises the apparatus in accordance with the present invention.

The method in accordance with the present invention can be implemented by the apparatus in accordance with the present invention. In particular, the method in accordance with the present invention can be implemented by the controller of the apparatus in accordance with the present invention. The controller may be a data processing device, for example, a computer (for example, servers, programmable logic controllers (PLC), handheld computer systems, pocket PC devices, mobile radio devices and other communication devices that can process data in a computer-aided manner, processors and other electronic devices for data processing), a cloud-based system, and/or a control device of the automated installation.

In connection with the present invention, the term "continuously" is understood to mean at predetermined times and, in particular, as after a predefined interval of time in each case. A step which is performed continuously is therefore understood to mean a step that is performed at particular, predefined times or after the expiry of a predefined interval of time in each case.

The automated installation has a digital twin. The digital twin may have been created during a planning phase or development phase of the automated installation. The digital twin is a computer-aided, virtual model of the automated installation, which model represents the (most important) elements of the automated installation and can simulate the process performed by the installation (for example, manufacturing process, or method.). The behavior of the automated installation or the process can be simulated with sufficient accuracy via the digital twin (for example, with the aid of a simulation for virtual $IBS_{[i1]}$), with the result that the real installation states (such as during production, a start-up phase, or a switch-off process) are represented by the simulated installation states. The simulation or the digital twin can be put into the same state as the real automated installation on the basis of a real installation state (signals or data) of the real automated installation.

Rolling data capture is performed, where the real installation state is continuously captured. For this purpose, the real installation state is continuously determined and stored, with the result that there is a temporal sequence of captured real installation states. Here, each of the installation states is characterized by at least one physical variable. The at least one physical variable may be, for example, a temperature, a pressure, a force, a position and/or a speed and/or an acceleration of an element of the automated installation or of a workpiece/process material in the automated installation, a vibration, and/or a rotational speed. The at least one physical variable can be continuously captured via the at least one sensor in or on the automated installation. The at least one sensor may be a temperature sensor, a force sensor, an acceleration sensor, a position sensor, and/or a pressure sensor. The at least one sensor may be an array of individual sensors.

The captured real installation states are continuously checked to determine whether a fault exists in a (latest) real installation state. This may be effected, for example, by comparing the captured real installation states with stored known faults. A fault in the captured real installation states can also be identified by a user (for example, a technician, or an installation engineer).

As soon as a fault is identified in one of the captured real installation states, the time at which the faulty installation state occurred is determined and stored. A (past) captured real installation state in which there was no fault is also selected. Here, the most recent real installation state without a fault is preferably identified as the most recent fault-free installation state.

The most recent fault-free installation state can be optionally checked using the digital twin by checking whether a simulation with the digital twin, starting from the most recent fault-free installation state (without a deliberately added disturbance or assumption of a faulty element), leads to a simulated installation state in which there is no fault. If this is not the case (there is a fault), then the most recent fault-free installation state is not suitable since the cause of a fault was already present in the most recent fault-free installation state, and a different (earlier) real installation state can be selected as the most recent fault-free installation state.

The digital twin is then initialized with the most recent fault-free installation state, with the result that the digital twin is in the same state as the fault-free real automated installation, i.e., the automated installation before the occurrence of the fault.

In the initialized digital twin, at least one (virtual) element (for example, a virtual representation of an actuator) is now assumed faulty or defective. Complete failure of the at least one element or a deviation from the desired behavior of the at least one element can be assumed, for example. The digital twin is accordingly adapted or manipulated, with the result that the at least one element assumed faulty is used in the simulation instead of the corresponding at least one element that is functioning properly. The resulting simulated installation state is therefore based on a simulated (virtually performed) process of the digital twin with the at least one element that is assumed to be faulty until the fault time.

The simulation with the digital twin comprising the at least one (virtual) element assumed to be faulty is performed from a time at which the most recent fault-free installation state was present until the stored fault time.

After the simulation with the manipulated digital twin (comprising the at least one element assumed to be faulty) has been performed, the simulated installation state is compared with the real installation state at the fault time. If the simulated installation state and the real installation state at the fault time match, then the cause of the fault can be inferred. For this purpose, the at least one (virtual) element of the digital twin that is assumed to be faulty can be directly identified as the at least one faulty (real) element of the (real) automated installation that led to the fault. The cause of the fault is therefore known and can be accordingly rectified in the real automated installation.

If the simulated installation state and the real installation state at the fault time do not match, then the digital twin is initialized again with the most recent fault-free installation state and at least one other element of the digital twin is assumed to be faulty. The simulation is then performed again, as described above, and the resulting new simulated installation state is compared with the real installation state at the fault time. This is iteratively repeated until the resulting simulated installation state matches the real installation state at the fault time.

Combinations of (virtual) elements of the digital twin can also be assumed to be faulty.

In addition, it is possible to specify an abort criterion (for example, all (virtual) elements of the digital twin have been assumed to be faulty once or a predefined number of combinations of (virtual) elements of the digital twin have been assumed to be faulty), upon the reaching of which the iteration is aborted.

If the actually achieved installation or fault state cannot be reproduced by any combination of elements assumed to be faulty, then the search for the cause in the real installation can be limited to processes or installation components that are possibly not represented virtually and/or intervals of time that are no longer plausible. If the simulated installation state therefore does not match the real installation state at the fault time at the end of the (iterative) method and the cause of the fault therefore has not been found, then the search for the fault in the real automated installation can be at least limited based on the previous simulation results of the method.

The present invention makes it possible to reliably identify causes of faults in automated installations without any additional modeling effort in the development process or even the simulation of all possible fault states. The described method and the corresponding apparatus or automated installation make it possible to automatically analyze fault situations based on the digital twin of the automated installation. The cause(s) of a fault can be identified based this automatic analysis (if successful) and appropriate fault rectification or repair of the automated installation can be quickly performed. Complicated and possibly nevertheless incomplete previous modeling of the fault behavior is not necessary for this purpose.

In accordance with an embodiment of the present invention, a type of fault from a plurality of different types of faults is assumed for the at least one element assumed to be faulty in step d).

Therefore, it is not only possible to assume a particular fault in a (virtual) element of the digital twin, but rather it is possible to select a type of fault from various possible types of faults and to accordingly manipulate the digital twin.

If the simulated installation state of the manipulated digital twin having the at least one (virtual) element accordingly assumed to be faulty does not match the real installation state at the fault time, then a different type of fault can also be assumed instead of another (virtual) element in the next iteration in step d). This makes it possible to more accurately simulate the (faulty) installation states with the digital twin and therefore to identify the cause of the fault in a more reliable manner.

In accordance with a further embodiment, a one-off fault, a temporarily occurring fault and/or a permanent fault is/are assumed for the at least one element assumed to be faulty in step d).

In accordance with a further embodiment of the present invention, a failure probability for the at least one identified faulty element and/or for the automated installation is derived from the at least one identified faulty element in substep e1).

A probability of a failure (for example, based on historical failure frequencies, or $MTBF_{[2]}$) is derived and can be used to prioritize simulation of failure scenarios.

In accordance with another embodiment of the present invention, the operation of determining a most recent fault-free installation state in step b) comprises the substeps of:

b1) selecting a provisional most recent fault-free installation state in the captured real installation states;

b2) provisionally initializing the digital twin with the selected provisional fault-free installation state;

b3) provisionally simulating the installation state via the provisionally initialized digital twin until the determined fault time;

b4) checking whether there is no fault in the provisionally simulated installation state, wherein substeps b1) to b4) are performed again if there is a fault in the provisionally simulated installation state. Here, an earlier real installation state is provisionally selected from the captured real installation states as the previously provisionally selected installation state.

The last (most recent) real installation state in the captured real installation states can therefore be determined in a particularly reliable manner and used to initialize the digital twin.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and the technical environment are explained in more detail below on the basis of the figures. It is pointed out that the invention is not intended to be restricted by the exemplary embodiments shown. In particular, it is also possible, unless explicitly described otherwise, to extract partial aspects of the substantive matter explained in the figures and to combine them with other parts and knowledge from the present description and/or figures. In particular, it is pointed out that the figures and, in particular, the proportions shown are only schematic. Identical reference signs denote identical objects, and so explanations from other figures can be additionally used, if appropriate.

FIG. 2 shows a schematic view of the automated installation having the apparatus for identifying causes of faults in automated installations in accordance with the invention.

DETAILED DESCRIPTION OF THE EXEMPLARY EMBODIMENTS

Figure 1:
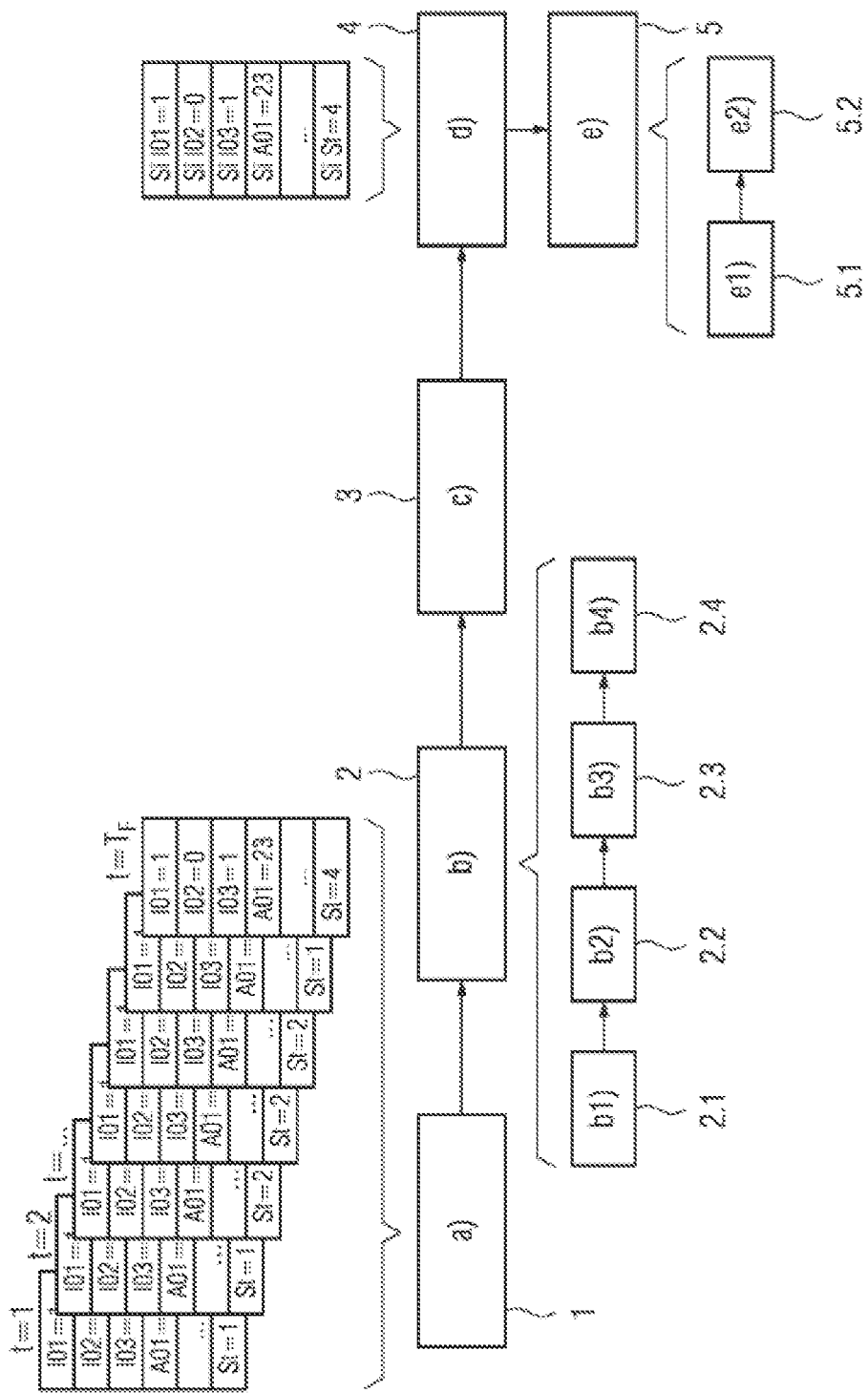
FIG. 1 shows a schematic flowchart of the method for identifying causes of faults in automated installations in accordance with the invention.

FIG. 1 schematically shows the method for identifying causes of faults in automated installations in accordance with the invention. The method comprises the steps of a) continuously capturing 1 a real installation state, b) continuously checking 2, c) initializing 3 a digital twin, d) simulating 4 the installation state, and e) comparing 5 the simulated installation state.

In step a) of continuously capturing 1 the real installation state, the real installation state St is captured, i.e., determined and stored, continuously (in each case after expiry of a predetermined interval of time). The captured installation states St each comprise physical variables I01 . . . I03, A01 that can be measured by applicable sensors in or on an automated installation.

In step b) of continuously checking 2, the captured real installation states St are checked to determine whether a fault in one (the latest) of the captured real installation states St exists. If this is the case, then the time at which the captured real installation state comprising the fault is present is determined (and buffered) as the fault time $T_F$. A most recent (latest) fault-free installation state in the captured real installation states is likewise determined (and buffered).

The operation of determining a most recent fault-free installation state in step b) comprises the substeps of b1) selecting 2.1 a provisional most recent fault-free installation state, b2) provisionally initializing 2.2 the digital twin, b3) provisionally simulating 2.3 the installation state, and b4) checking 2.4.

In substep b1) of selecting 2.1 the provisional most recent fault-free installation state, the provisional most recent (latest) fault-free installation state is selected from the captured real installation states St. This provisional most recent fault-free installation state is used to initialize the digital twin of the automated installation in substep b2) of provisionally initializing 2.2 the digital twin. The digital twin is then in the same installation state as the real automated installation at the latest or last time at which there was not yet a fault in the real automated installation. The (virtual) installation state is then via the initialized digital twin until the fault time $T_F$ in substep b3) of provisionally simulating 2.3 the installation state. The provisional simulated installation state at the fault time $T_F$ is checked, in step b4) of checking 2.4, in order to determine whether no fault in the provisionally simulated installation state exists. If this is the case, then the provisional most recent fault-free installation state actually corresponds to the most recent fault-free installation state and can be used in step c). In contrast, substeps b1) to b4) are performed again if a fault exists in the provisionally simulated installation state (at the fault time $T_F$) since the cause of the fault was then already present in the provisionally most recent fault-free installation state. An earlier real installation state is accordingly provisionally selected from the captured real installation states as the previously provisionally selected installation state.

In step c) of initializing 3 the digital twin, the digital twin is now initialized with the most recent (latest) fault-free installation state and is therefore placed into the same state as the real automated installation before the occurrence of the cause of the fault.

In step d) of simulating 4 the installation state, simulation is then performed from the time of the most recent fault-free installation state to the fault time using the initialized digital twin, and the simulated installation state at the fault time is buffered. However, at least one element of the digital twin is assumed to be faulty before the simulation. One of several predefined types of fault can be assumed for the at least one element.

In step e) of comparing 5 the simulated installation state, the simulated installation state at the fault time is compared with the real installation state at the fault time.

Step e) of comparing 5 the simulated installation state comprises the substeps of e1) identifying 5.1 at least one faulty element and e2) repeating 5.2 steps c) to e).

If the simulated installation state at the fault time matches the real installation state at the fault time then, in substep e1) of identifying 5.1 at least one faulty element, at least one faulty element of the automated installation is identified as the cause of the fault in the automated installation based on the at least one element of the digital twin that is assumed to be faulty. In this case, a failure probability for the at least one identified faulty element and/or for the automated installation can also be derived from the at least one identified faulty element.

In substep e2) of repeating 5.2 steps c) to e), steps c) to e) are iteratively repeated if the simulated installation state at the fault time does not match the real installation state at the fault time. In this case, at least one other element of the digital twin is assumed to be faulty and/or another type of fault for the same element as before is assumed in step d).

FIG. 2 schematically shows the automated installation 10 having the apparatus 20 for identifying causes of faults in automated installations. The apparatus 20 is configured to perform the method of FIG. 1. For this purpose, the apparatus 20 comprises at least one sensor 21 and a controller 22.

The at least one sensor 21 continuously captures at least one physical variable in or at the automated installation 10 (for example, a temperature, a pressure and a speed of a workpiece in the automated installation).

The controller 22 is communicatively connected to the at least one sensor 21, such that the at least one sensor 21 can transmit the captured at least one physical variable to the control unit 22. The controller 22 implements steps a) to e) of the method of FIG. 1.

Although specific embodiments have been illustrated and described here, it is clear to a person skilled in the art that there are a multiplicity of alternatives and/or equivalent implementations. It should be recognized that the exemplary configurations or embodiments are only examples and are not intended to restrict the scope, the applicability or the configuration in any way. Rather, the above summary and detailed description will provide a person skilled in the art with sufficient instructions for implementing at least one preferred embodiment, in which case it goes without saying that different changes in the function and arrangement of the elements described in an exemplary configuration do not go beyond the field of application explained in the attached claims and their legal equivalents. This application is generally intended to cover all adaptations or variations of the specific embodiments discussed here.

In the detailed description above, various features were combined in one or more examples in order to keep the disclosure concise. It goes without saying that the above description is intended to be illustrative, rather than restrictive. It is intended to cover all alternatives, changes and equivalents which may be included within the scope of the invention. Many other examples will become obvious to a person skilled in the art when studying the above disclosure.

In order to enable a comprehensive understanding of the invention, use is made of specific nomenclature which was used in the above disclosure. However, it will become clear to a person skilled in the art in the light of the specification contained therein that the specific details are not needed to apply the invention. The above descriptions of specific embodiments of the present invention are thus presented for illustrative and descriptive purposes. They are not intended to be exhaustive or to limit the invention to the exact embodiments disclosed above; many modifications and variations with respect to the teachings mentioned above are obviously possible. The embodiments were selected and described to best explain the principles of the invention and its practical applications and in order to therefore provide other experts with the opportunity of best applying the invention and various embodiments with various modifications, as appears to be suitable for the respective use. The terms "including" and "in which" are used throughout the specification as equivalents of the respective terms "comprising" and "wherein". In addition, the terms "first", "second", "third" etc. are used only as a designation and are not intended to impose numerical requirements on the objects or to specify a particular ranking. In connection with the present description and the claims, the conjunction "or" should be understood as meaning an inclusion ("and/or"), rather than being exclusive ("either . . . or").

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for identifying causes of faults in automated installations, the method comprising:
   a) capturing continuously a real installation state of an automated installation, the real installation state comprising at least one physical variable of the automated installation;
   b) checking continuously whether a fault in the captured real installation states exists and, if the fault exists in the captured real installation states, determining a most recent fault-free installation state in the captured real installation states and determining a fault time;
   c) initializing a digital twin of the automated installation with the determined most recent fault-free installation state;
   d) simulating the installation state via the initialized digital twin until the determined fault time, at least one element of the digital twin being assumed faulty; and
   e) comparing the simulated installation state at the determined fault time with the real installation state at the fault time and one of e1) identifying (5.1) at least one faulty element of the automated installation as the cause of the fault in the automated installation on the basis of the at least one element of the digital twin that is assumed faulty if the simulated installation state at the fault time matches the real installation state at the fault time or e2) repeating (5.2) steps c) to e) if the simulated installation state at the fault time fails to match the real installation state at the fault time, at least one other element of the digital twin being assumed to be faulty during step d).

2. The method as claimed in claim 1, wherein a type of fault from a plurality of different types of faults is assumed for the at least one element assumed to be faulty in step d).

3. The method as claimed in claim 2, wherein at least one of (i) a one-off fault, (ii) a temporarily occurring fault and (iii) a permanent fault is assumed for the at least one element assumed to be faulty in step d).

4. The method as claimed in claim 1, wherein a failure probability for at least one of (i) the at least one identified faulty element and (ii) the automated installation is derived from the at least one identified faulty element in sub step e1).

5. The method as claimed in claim 1, wherein said determining the most recent fault-free installation state in step b) comprises:
   b1) selecting a provisional most recent fault-free installation state in the captured real installation states;
   b2) initializing the digital twin with the selected provisional fault-free installation state provisionally;
   b3) simulating the installation state provisionally via the provisionally initialized digital twin until the determined fault time; and
   b4) checking whether no fault in the provisionally simulated installation state exists, substeps b1) to b4) being reperformed if a fault in the provisionally simulated installation state exists and an earlier real installation state being provisionally selected from the captured real installation states as the previously provisionally selected installation state.

6. An apparatus for identifying causes of faults in automated installations, comprising:
   at least one sensor configured to continuously capture at least one physical variable of the automated installation; and
   a controller communicatively connected to the at least one sensor, the controller being configured to:
      capture a real installation state of an automated installation continuously, the real installation state comprising the at least one physical variable captured by the at least one sensor;
      check continuously whether a fault exist in the captured real installation states and, if there a fault exists in the captured real installation states, determine a most recent fault-free installation state in the captured real installation states and determine a fault time;
      initialize a digital twin of the automated installation with the determined most recent fault-free installation state;
      simulate the installation state via the initialized digital twin until the determined fault time, at least one element of the digital twin being assumed faulty;
      compare the simulated installation state at the determined fault time with the real installation state at the fault time; and
      at least one of (i) identify at least one faulty element of the automated installation as the cause of the fault in the automated installation based on the at least one element of the digital twin assumed to be faulty if the simulated installation state at the fault time matches the real installation state at the fault time and (ii) re-initialize the digital twin, simulate the installation state and compare the simulated installation state with the real installation state if the simulated installation state at the fault fails to match the real installation state at the fault time, at least one other element of the digital twin being assumed faulty.

7. The apparatus as claimed in claim 6, wherein the control is further configured to assume a type of fault from a plurality of different types of faults for the at least one element assumed to be faulty during said simulation of the installation state.

8. The apparatus as claimed in claim 7, wherein the controller is further configured to assume at least one of (i) a one-off fault, (ii) a temporarily occurring fault and (iii) a permanent fault for the at least one element assumed to be faulty during said simulation of the installation state.

9. The apparatus as claimed in claim 7, wherein the controller is further configured to derive a failure probability for at least one of (i) the at least one identified faulty element and (ii) the automated installation from the at least one identified faulty element during said identification of at least one faulty element of the automated installation as the cause of the fault in the automated installation.

10. The apparatus as claimed in claim 7, wherein controller is further configured, during said continuously checking to determinate the most recent fault-free installation state, to:
  b1) select a provisional most recent fault-free installation state in the captured real installation states;
  b2) initialize the digital twin with the selected provisional fault-free installation state provisionally;
  b3) simulate the installation state provisionally via the provisionally initialized digital twin until the determined fault time; and
  b4) check whether no fault in the provisionally simulated installation state exists, said select, initialize, simulation and checking of b1) to b4) being respectively reperformed if a fault in the provisionally simulated installation state exists and an earlier real installation state being provisionally selected from the captured real installation states as the previously provisionally selected installation state.

11. The apparatus as claimed in claim 6, wherein the apparatus is implemented in an automated installation.

* * * * *